(12) United States Patent
Francko et al.

(10) Patent No.: US 7,669,364 B2
(45) Date of Patent: Mar. 2, 2010

(54) DEVICES, KITS, AND METHODS FOR PROVIDING PROTECTION TO PLANTS

(75) Inventors: David A. Francko, Oxford, OH (US);
Kenneth G. Wilson, Oxford, OH (US);
Barry D. Landrum, Franklin, OH (US)

(73) Assignee: Miami University, Oxford, OH (US)

(*) Notice: Subject to any disclaimer, the term of this patent is extended or adjusted under 35 U.S.C. 154(b) by 1036 days.

(21) Appl. No.: 11/290,084

(22) Filed: Nov. 30, 2005

(65) Prior Publication Data
US 2006/0150475 A1 Jul. 13, 2006

Related U.S. Application Data

(60) Provisional application No. 60/631,763, filed on Nov. 30, 2004.

(51) Int. Cl.
*A01G 13/02* (2006.01)
(52) U.S. Cl. ...................................................... 47/29.5
(58) Field of Classification Search ............... 47/29.5, 47/29.3, 29.2, 31, 31.1, 32.4, 45, 47, 19
See application file for complete search history.

(56) References Cited

U.S. PATENT DOCUMENTS

| | | | | | |
|---|---|---|---|---|---|
| 704,116 | A | * | 7/1902 | Ross | 47/29.5 |
| 951,807 | A | * | 3/1910 | Erdly | 47/29.5 |
| 1,641,244 | A | * | 9/1927 | Woodruff | 47/31.1 |
| 2,753,662 | A | * | 7/1956 | Behnke | 47/29.2 |

* cited by examiner

*Primary Examiner*—Francis T Palo
(74) *Attorney, Agent, or Firm*—Calfee, Halter and Griswold LLP

(57) ABSTRACT

Plant protection devices, kits, and methods of protecting plants during adverse conditions are provided. The plant protection devices can have a enclosure and/or a precipitation member assembly. The plant protection devices can provide wind protection, mulch retention, and precipitation deflection.

18 Claims, 13 Drawing Sheets

DEVICES, KITS, AND METHODS FOR PROVIDING PROTECTION TO PLANTS

CROSS REFERENCE TO RELATED APPLICATIONS

This application claims priority to and any other benefit of U.S. Provisional Patent Application No. 60/631,763, filed Nov. 30, 2004, the entirety of which is incorporated by reference herein. This application also claims priority to and any other benefit of Patent Cooperation Treaty Application No. PCT/US2004/039897, filed Nov. 30, 2004, the entirety of which is incorporated by reference herein.

BACKGROUND

The foliage of palms and other broadleaf evergreen ornamentals can be damaged or killed during winter by a combination of cold temperatures and wind stress. Heavy mulching reduces temperature stress to roots and lower parts of the plant shoot tissues and is an effective way to protect marginal ornamentals from winter cold (reviewed in Francko 2003). However, winter winds tend to blow this protective mulch layer away. Further, mulching cannot protect plant tissues above the mulch line that are exposed to the environment.

In addition, palms and many ornamentals are susceptible to late winter/early spring mortality caused by bud/crown rot disease. Winter precipitation collects in the open crown cavities of these species, freezing and thawing and resulting in mechanical damage to tender bud tissue. This damage creates ideal growing conditions for opportunistic fungal and bacterial pathogens. In susceptible species exposed to sub-lethal cold, the majority of spear leaves are destroyed by this disease, and, left untreated, this disease can kill all the viable bud tissue and thus the entire plant (reviewed in SPEPS 1994 and Francko 2003).

There remains a need in the art for ways to ameliorate temperature and wind stress to plants. Additionally, there remains a need in the art for ways to exclude atmospheric precipitation and frost deposition from the crown cavity of palms, ornamentals, and other plants.

SUMMARY OF THE INVENTION

In accordance with embodiments of the present invention, devices for plant protection are provided. The devices comprise an enclosure having at least one side wall and having an open top side and an open bottom side disposed such that the enclosure can be placed around at least one plant and at least one elongated leg. The enclosure is fastened to the at least one elongated leg disposed to anchor said enclosure near the surface around at least one plant.

In accordance with embodiments of the present invention, devices for plant protection are provided. The devices comprise an enclosure having at least one side wall and having an open top side and an open bottom side disposed such that the enclosure can be placed around at least one plant. Additionally, the devices have at least one elongated leg. The enclosure is fastened to the at least one elongated leg disposed to anchor the enclosure near the surface around the at least one plant. The devices also comprise a precipitation member, and the precipitation member is fastened to the at least one elongated leg and disposed such that water is deflected from the interior of the enclosure.

In accordance with additional embodiments of the present invention, devices for plant protection are provided. The devices comprise at least one elongated leg and a precipitation member. The at least one elongated leg can be placed in the surface near to at least one plant. The precipitation member is fastened to the at least one elongated leg and disposed such that precipitation is deflected away from at least one plant.

In accordance with embodiments of the present invention, plant protection kits are provided. The kits comprise at least one enclosure having at least one side wall, an open top side, and an open bottom side. The kits further comprise at least one elongated leg and at least one precipitation member. The at least one enclosure, at least one elongated leg, and at least one precipitation member are configured to be disposed to provide wind and precipitation protection to at least one plant.

In accordance with further embodiments of the present invention, plant protection kits are provided. The kits can comprise at least one enclosure sheet configured to be disposed to form a enclosure having at least one side wall, an open top side, and an open bottom side; at least one elongated leg; and at least one precipitation member sheet configured to be disposed to form a precipitation member. The at least one enclosure, at least one elongated leg, and at least one precipitation member are configured to be disposed to provide wind and precipitation protection to at least one plant.

In accordance with embodiments of the present invention, devices for plant protection are provided. The devices comprise an enclosure having an open top side and an open bottom side and a precipitation member disposed above the enclosure. The enclosure is disposed such that the freestanding enclosure can be placed around at least one plant, and the device adds at least from about 0.5 to about 2.0 USDA Plant Hardiness Zone Equivalents of protection to a plant placed in the enclosure.

In accordance with other embodiments of the present invention, methods of reducing damage to at least one plant due to adverse conditions are provided. The methods comprise placing at least one enclosure around at least one plant and anchoring the at least one enclosure near to the surface around the at least one plant. The enclosure has at least one side wall, an open top side, and an open bottom side. The step of placing the at least one enclosure around the at least one plant adds at least from about 0.5 to about 2.0 USDA Plant Hardiness Zone equivalents of protection to the at least one plant during adverse conditions.

In accordance with embodiments of the present invention, methods of reducing damage to at least one plant due to adverse conditions are provided. The methods comprise placing at least one enclosure around at least one plant, anchoring the at least one enclosure near to the surface around the at least one plant, placing at least one precipitation member above the enclosure, and anchoring the at least one precipitation member in place. The enclosure has at least one side wall, an open top side, and an open bottom side. The precipitation member is disposed to deflect precipitation from the at least one enclosure. The steps of placing the at least one enclosure around the at least one plant and placing the at least one precipitation member above the enclosure adds at least from about 0.5 to about 2.0 USDA Plant Hardiness Zone equivalents of protection to the at least one plant during adverse conditions.

In accordance with embodiments of the present invention, methods of reducing damage to at least one plant due to adverse conditions are provided. The methods comprise placing at least one precipitation member such that precipitation is deflected from at least one plant and anchoring the at least one precipitation member in place. The step of placing the at least one precipitation member adds at least from about 0.5 to about 2.0 USDA Plant Hardiness Zone equivalents of protection to said at least one plant during adverse conditions.

BRIEF DESCRIPTION OF THE SEVERAL VIEWS OF THE DRAWINGS

The following detailed description of embodiments of the present invention can be best understood when read in conjunction with the following drawings, where like structure is indicated with like reference numerals and in which.

DETAILED DESCRIPTION OF EMBODIMENTS OF THE INVENTION

The present invention will now be described with occasional reference to the specific embodiments of the invention. This invention may, however, be embodied in different forms and should not be construed as limited to the embodiments set forth herein. Rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise. All publications, patent applications, patents, and other references mentioned herein are incorporated by reference in their entirety.

Unless otherwise indicated, all numbers expressing quantities of ingredients, properties such as molecular weight, reaction conditions, and so forth as used in the specification and claims are to be understood as being modified in all instances by the term "about." Accordingly, unless otherwise indicated, the numerical properties set forth in the following specification and claims are approximations that may vary depending on the desired properties sought to be obtained in embodiments of the present invention. Notwithstanding that the numerical ranges and parameters setting forth the broad scope of the invention are approximations, the numerical values set forth in the specific examples are reported as precisely as possible. Any numerical values, however, inherently contain certain errors necessarily resulting from error found in their respective measurements.

Figure 1A:
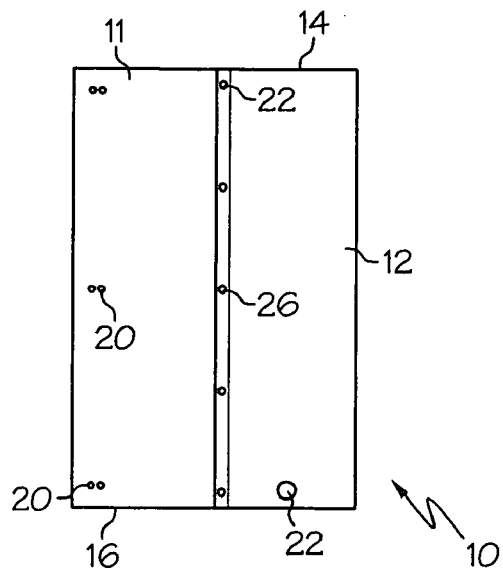
FIGS. 1A-1D schematically illustrate enclosure devices in accordance with embodiments of the present invention.
Figure 1B:
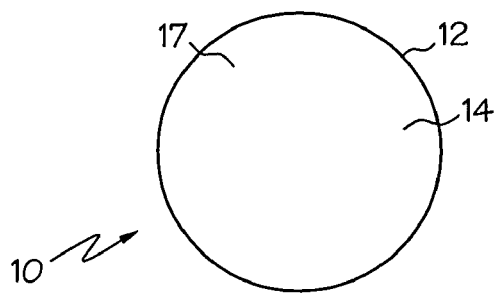

In accordance with embodiments of the present invention, devices for plant protection are provided. Referring to FIGS. 1A and 1B, a device 10 is illustrated. The device 10 is a enclosure 11 having at least one side wall 12, an open top side 14 and an open bottom side 16. For purposes of defining and describing the present invention, the term "open" shall be understood as referring to at least one side having an opening such that air may pass into the interior of the device. It will be understood that the open top side 14 and/or the open bottom side 16 can be partially or fully open. In one example, as illustrated in FIG. 1B, the top side and bottom side are fully open.

The enclosure 11 is disposed such that the enclosure 11 can be placed around at least one plant (not shown) such that the plant is disposed in the interior 17 of the enclosure 11. The at least one sidewall 12 can be disposed to fully or partially enclose the interior 17. In one example, as shown in FIGS. 1A and 1B, the sidewall 17 fully encloses the interior 17. In one example, the enclosure 11 can be freestanding. For purposes of defining and describing the present invention, the term "freestanding" shall be understood as referring to an enclosure that can be placed around and protect a plant without any additional structure other than at least one elongated leg.

Figure 1C:
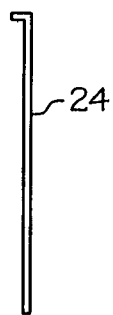
Figure 1D:

Referring to FIG. 1D, the device 10 further includes at least one elongated leg 18. The enclosure 11 can be fastened to the at least one elongated leg 18, and the at least one elongated leg 18 is disposed to anchor said enclosure 11 near the surface around at least one plant (not shown). For purposes of defining and describing the present invention, the term "near" shall be understood as referring to an enclosure installed close enough to the surface to provide at least one of increased mulch retention, reduced wind, or a slight increase of temperature around the plant. For example, the elongated leg 18 can be placed in a surface, such as the ground or mulch. The enclosure 11 can be fastened to the at least one elongated leg 18 in any suitable manner. For example referring to FIGS. 1A and 1D, the enclosure can have at least one set of holes 20 through which a tie (not shown) or other suitable fastener can be passed and fastened to the at least one elongated leg 18. In one example, the device 10 has two elongated legs 18. In another example, the device 10 has three elongated legs 18. The elongated legs 18 can have any suitable dimensions and be made of any suitable materials. In one example, the elongated legs 18 can be from about 10 to about 80 inches in height. In another example, the elongated legs 18 can be about 48 inches in height and be made from stainless steel, aluminum, plastic, or any other suitable material. In yet another example, the elongated leg 18 can be 72 inches in height. It will be understood that the enclosure 11 could be installed in another way, and that the elongated legs 18 are not required in every embodiment of the present invention.

In another example, additional fasteners can be used to anchor the enclosure 11 near the surface. In one example referring to FIGS. 1A and 1C, several holes 22 can be provided near the bottom side 16 of the enclosure 11. A bracket, such as an L-shaped bracket 24, as shown in FIG. 1C, can be passed through the hole 22 and driven into the surface. It will be understood that any suitable number of holes and brackets can be used, and any suitable fastener can be used. In one example, three brackets 24 and holes 22 are provided. It will be further understood that it is not necessary that additional fasteners be used to anchor the enclosure 11 to the surface.

The enclosure 11 may be made of any suitable material in any suitable manner. For example, the enclosure 11 can be translucent or transparent to light. In this respect, "light" shall be understood as referring to at least one of the wavelengths of light produced by the sun. In one example, the enclosure 11 is transparent to visible light. The translucence or transparency of the enclosure 11 can allow photosynthesis of a plant to continue while the enclosure 11 is installed around the plant.

In one example, the enclosure 11 can be made of plastic of any suitable thickness. In another specific example, the enclosure 11 can be made of Plexiglass or Lexan. The enclosure 11 can be formed in any suitable manner. In one example, as illustrated in FIGS. 1A and 1B, a sheet of Lexan can be formed into a cylinder and riveted with at least one rivet 26. The rivets 26 can be aluminum pop rivets, and the sheet of Lexan can be 0.0625 inches thick. In another example, the enclosure 11 can be molded or thermoformed in any suitable manner. For example, the enclosure 11 can be formed by injection molding, blow molding, or thermoforming. It will be understood that the enclosure 11 can be manufactured in any suitable manner. It will be further understood that the enclosure 11 can be manufactured using any suitable number of sidewall 12 pieces.

In yet another example, the enclosure 11 can be of any suitable shape. In one example, the enclosure 11 can have more than one side wall 12 to form a triangular, rectangular, hexagonal, octagonal, or any other suitably shaped enclosure (not shown). In another example, as illustrated in FIGS. 1A and 1B, the enclosure 11 can be cylindrically shaped. In yet another example, the enclosure 11 can be frustoconically or conically shaped.

The enclosure 11 can be of any suitable size. For example, the enclosure 11 can be formed to have a diameter of from about 10 inches to about 40 inches. In one example, the enclosure 11 can be formed to have a diameter of about 15 inches or about 30 inches. It will be understood that the enclosure 11 can have a larger or smaller diameter. It will be further understood that the enclosure 11 can have any suitable dimensions for non-cylindrical shapes. In another example, the enclosure 11 can have a side wall 12 that is from about 10 inches to about 48 inches in height. In yet another example, the enclosure 11 can have a side wall 12 that is about 24 inches or 30 inches in height.

Referring now to FIGS. 3-7, another embodiment of a enclosure 11a is illustrated. The enclosure 11a has at least one sidewall 112, an open top side 114, and an open bottom side 116. The enclosure 11a can be formed from an enclosure sheet 120 that is a sheet of any suitable material that is fastened with fasteners 122 placed through fastening holes 124 that are overlapped prior to placing the fasteners 122 through the fastening holes 124, to form a cylindrical enclosure 11a. It will be understood that the fasteners 122 can be placed through the fastening holes 124 by the manufacturer, seller, or the end user of the enclosure 11a. It will further be understood that any suitable number of fastening holes 124 and any suitable type of fasteners 122 can be used. For example, six or eight fastening holes 124 can be disposed on the enclosure sheet 120, and three or four fasteners 122 can be provided. In one example, the fasteners 22 can comprise a bolt and wing nut assembly. In another example, a strap (not shown) can be provided to hold the enclosure sheet 120 in position so that the fasteners 122 can be placed through the fastening holes 124. The strap can be subsequently removed after the fasteners 122 are installed. It will be further understood that the enclosure sheet 120 can be of any suitable dimension and be of any suitable material. For example, the enclosure sheet 120 can be a plastic, Plexiglass, or Lexan sheet that is 96 inches long by 36 inches wide or 48 inches long by 24 inches wide. Additionally, the enclosure sheet 120 can be translucent or transparent to light.

Figure 10:
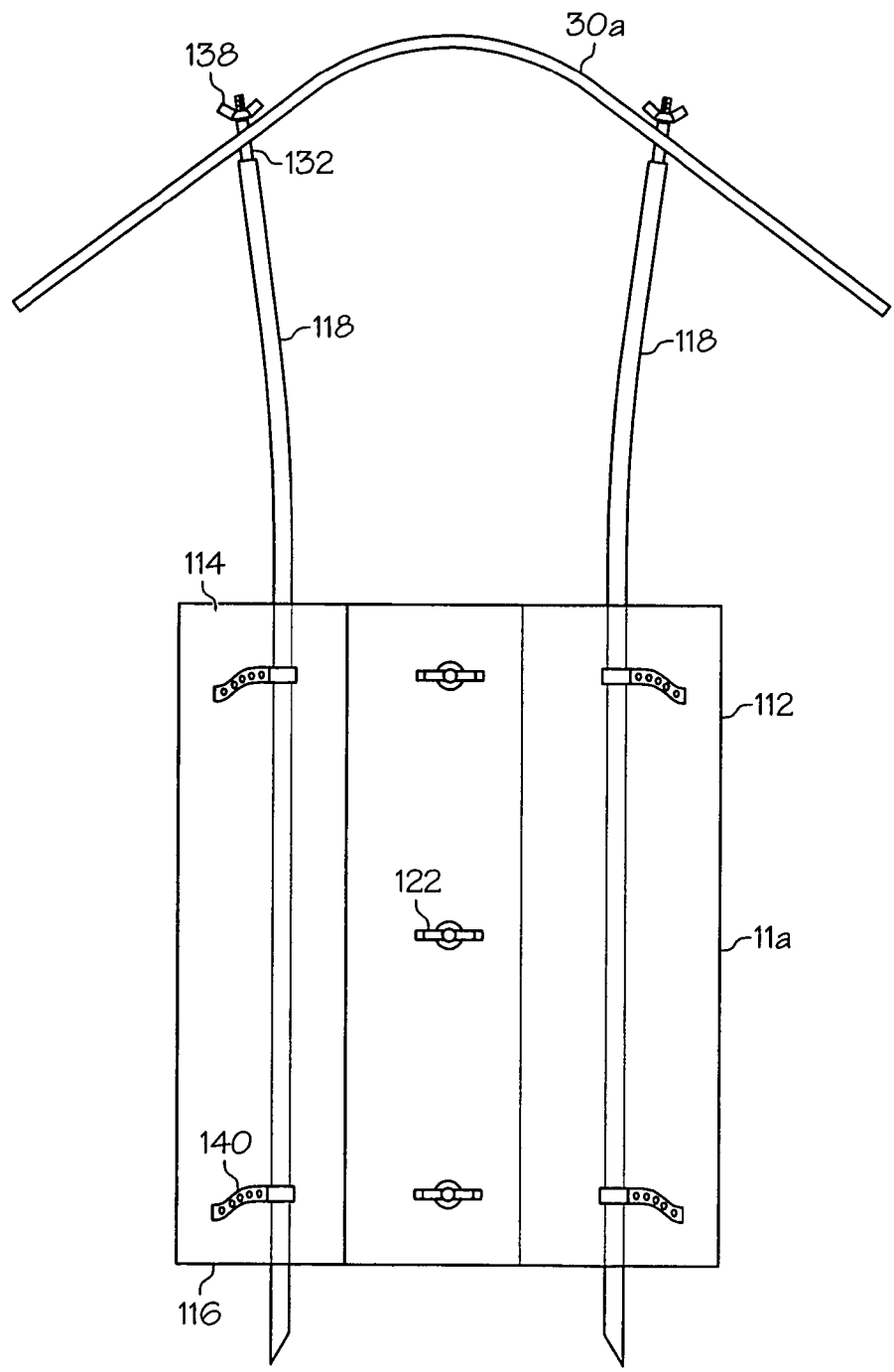
FIG. 10 is a front view of a precipitation member and enclosure in accordance with embodiments of the present invention.
Figure 11:
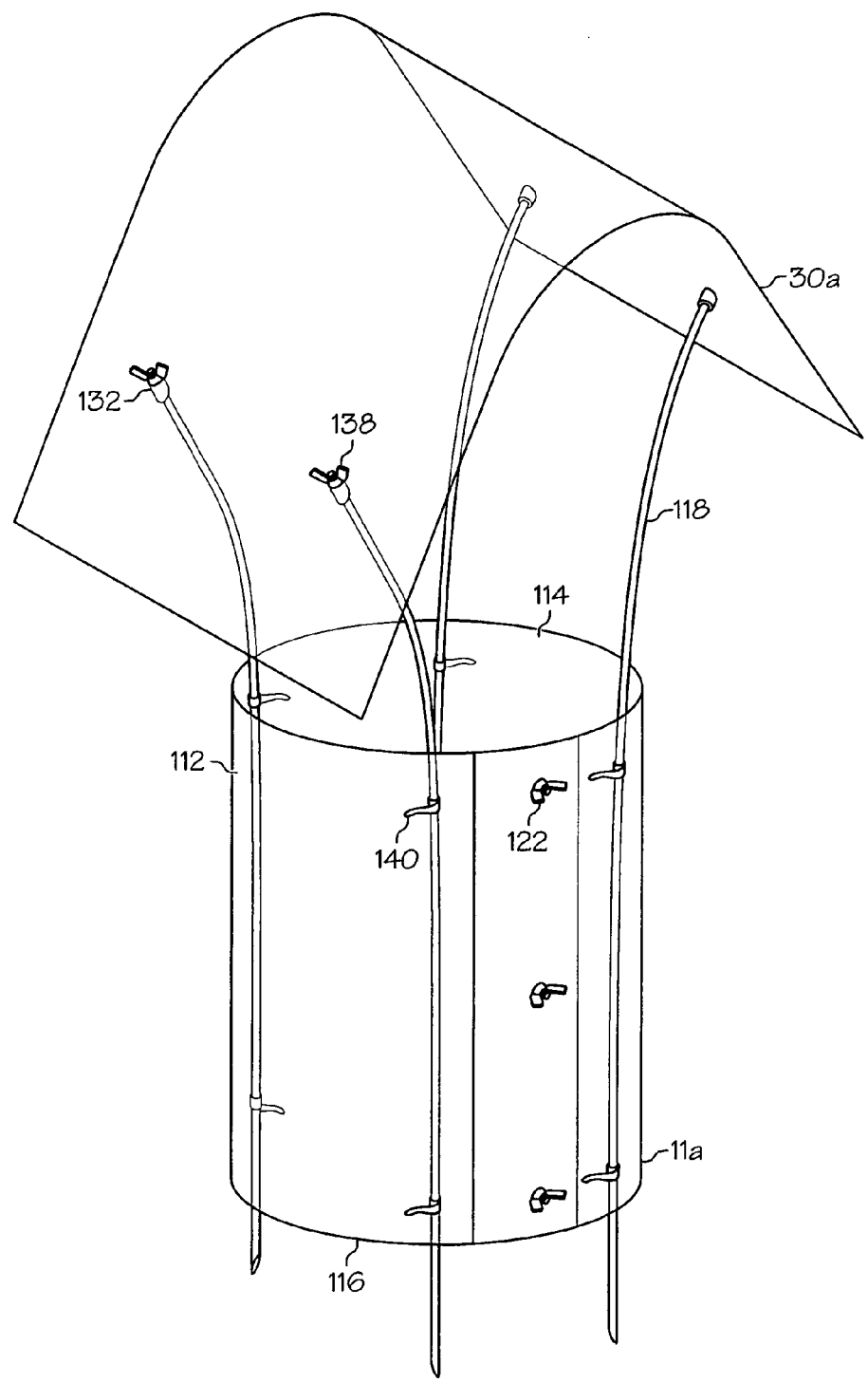
FIG. 11 is a plan view of a precipitation member and enclosure in accordance with embodiments of the present invention.
Figure 12:
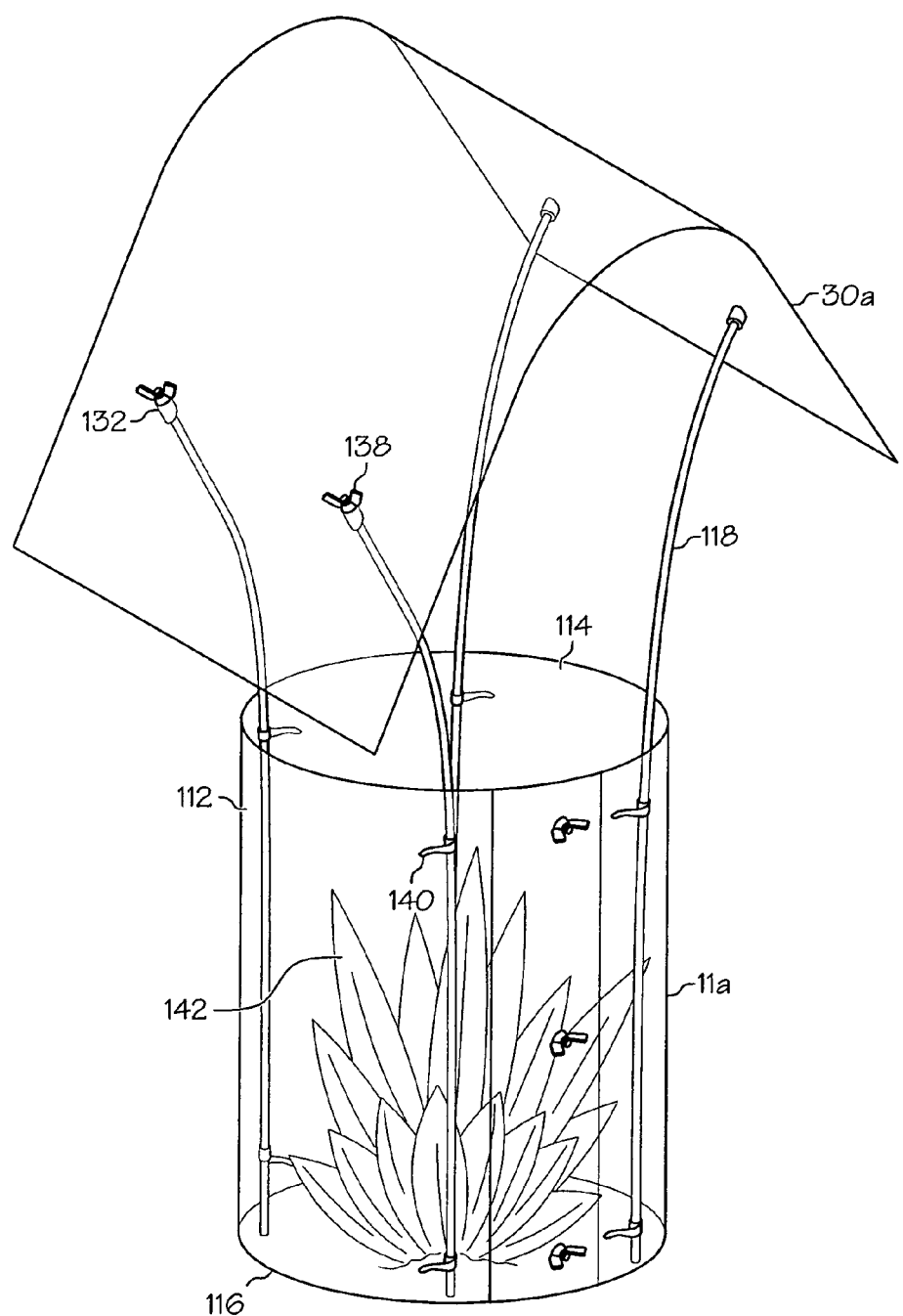
FIG. 12 is a plan view of a precipitation member and enclosure installed around a plant in accordance with embodiments of the present invention.
Figure 13:
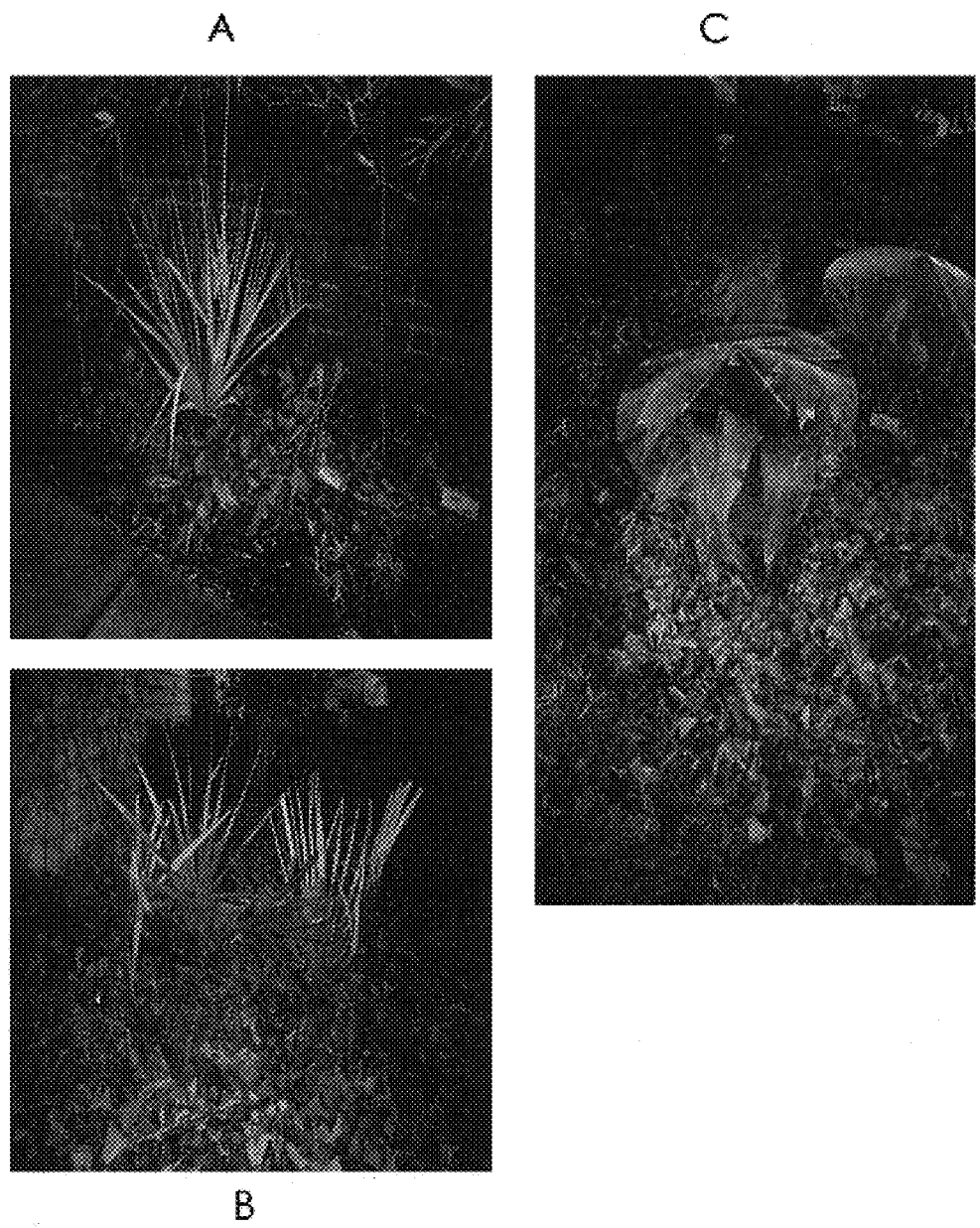
FIGS. 13A-E illustrate the appearance of various palms and other plants after exposure to winter conditions with or without the devices in accordance with embodiments of the present invention. Note: leaf mulching was removed prior to photographing plants. These illustrations typify performance of each species/variety noted in winter experimental series. (A) *S. minor* exposed to −8° F. with only heavy leaf mulching, showing almost complete defoliation. (B) pair of *S. minor* specimens exposed to −14° F. but enclosed within an open cylinder. Note that foliar damage was largely confined to leaf tips that were above the lip of the cylinder, which can just be seen in situ in this illustration. (C) specimen of *Aspidistra elatior* (cast iron plant) enclosed within a precipitation member enclosure, after −14° F. exposure. Note abundance of live tissue persisting into March. (D) Small *T. takil* in open enclosure showing only minor leaf tip burn after exposure to −7° F. (E) Small specimen of *T. fortunei* in precipitation member enclosure after exposure to −14° F., showing intact spear and perhaps 50% foliar survival through winter. (F) Larger specimen of *T. fortunei* protected by precipitation member enclosure after exposure to −5° F., showing ca. 50% leaf are survivorship and intact spear leaf. In contrast to FIGS. 4D, E, and F, palms of species in D, E, and F that are protected only with heavily-leaf-mulch and exposed to temperatures of −5 to −14° F. experience complete defoliation and high mortality.
Figure 13:
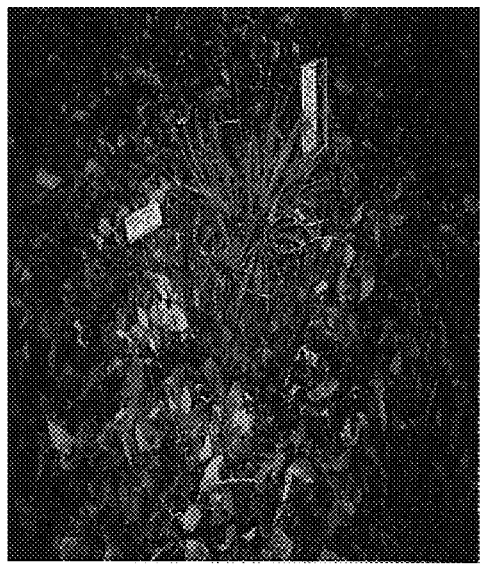
Figure 13:
Figure 13:

Referring now to FIGS. 3-6, the enclosure 11a may be provided with one or more elongated legs 118 for anchoring the enclosure 11a near to the surface around at least one plant (not shown). It will be understood that any suitable number of elongated legs 118 can be provided for fastening to the enclosure. For example, three or four elongated legs 118 can be provided. In one example, the enclosure 11a can comprise a freestanding enclosure. The legs 118 can be fastened to the enclosure 11a in any suitable manner. For example, anchoring holes 126 can be provided in the sheet 120 through which a fastener (140 in FIG. 10) can be passed to fasten the legs 118 to the enclosure 11a. The fasteners can be any suitable fasteners. For example, the fastener can be a tie. In one example, the legs 118 can be fastened to the inside 117 of the enclosure 11a after the sheet 120 is fastened to form the enclosure 11a. The elongated legs 118 can be made of any suitable material, as discussed herein. Additionally, the elongated legs 118 can be of any suitable dimension, and the legs 118 can have an angled bottom to assist the user in penetrating the surface with the legs 118.

Without intending to be limiting, it is believed that the enclosures can reduce winter damage to plants by retaining mulch around the plant, reducing wind, and/or slightly increasing the temperature around the plant.

Figure 2A:
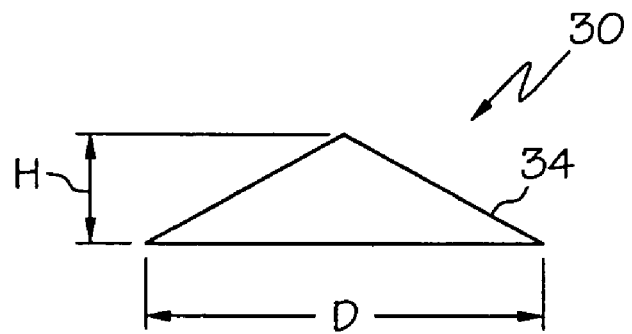
FIGS. 2A-2D schematically illustrate precipitation members in accordance with the present invention.
Figure 2B:
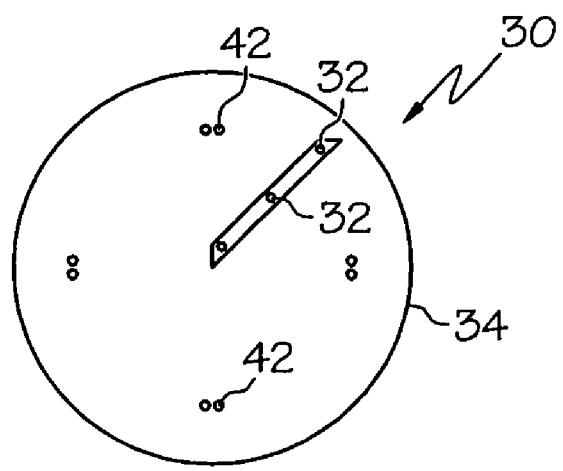
Figure 2C:
Figure 2D:
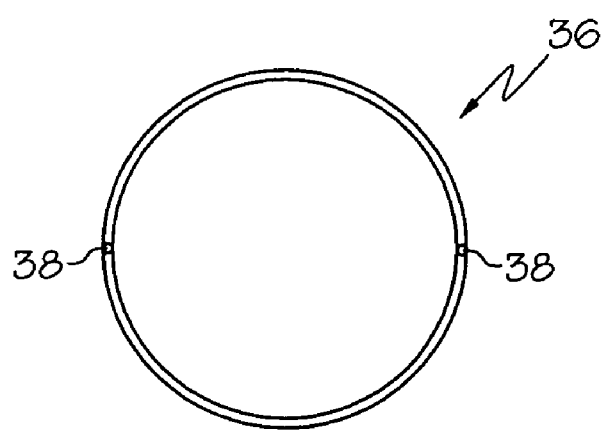
Figure 3:
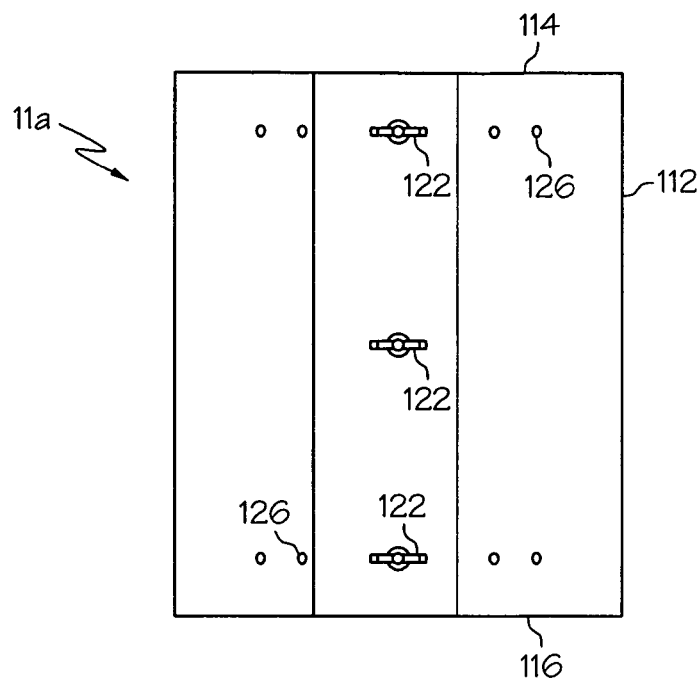
FIG. 3 is front view of an enclosure in accordance with embodiments of the present invention.

In accordance with some embodiments of the present invention, precipitation members are provided. The term "precipitation member" shall be understood as referring to a structure that is disposed such that precipitation is deflected from a plant that is below the precipitation member. Referring to FIGS. 2A and 2B, a precipitation member 30 is illustrated. In one embodiment, such as that shown in FIGS. 1A, 1D, 2A, and 2B, the precipitation member 30 can be used in conjunction with a enclosure 11, and the precipitation member 30 is disposed such that precipitation is deflected from the interior 17 of the enclosure 11. For purposes of defining and describing the present invention, the term "precipitation" shall be understood as referring to any form of water, such as rain, hail, snow, sleet, mist, etc., that falls to earth from the atmosphere. For purposes of defining and describing the present invention, the term "deflected" shall be understood as referring to at least some of the precipitation being kept out of the interior of the device or being kept off of at least part of a plant.

The precipitation member 30 can be fastened to the at least one elongated leg 18 in any suitable manner. In one example, the precipitation member 30 is disposed at a distance from the enclosure 11 on the elongated leg 18. This arrangement allows transpiration of water from the plant or evaporation of water from the soil around the plant, and this prevents rotting of the plant material. In addition, this arrangement prevents overheating because air is exchanged with the atmosphere outside the enclosure. It will be understood that the precipitation member 30 can be installed in any other suitable manner from that illustrated in the Figures.

The precipitation member 30 can have any suitable size and shape. In one example, the precipitation member 30 can have a conical shape as illustrated in FIG. 2A. In another example, the precipitation member 30 can have a dome shape, a curved planar shape, frustoconical, or any other suitable shape (not shown). In one example, when the precipitation member is domed or conical shaped, the precipitation member 30 can have a diameter D of from about 20 to about 50 inches. In one example, the precipitation member 30 can have a diameter of about 22 or about 40 inches. Any other suitable dimensions can be used. The precipitation member 30 can be shaped such that wind resistance is minimized. For example, a conical precipitation member 30 can have a height H of about 5 inches with a diameter D of about 22 inches or a height H of about 9.15 inches with a diameter D of about 40 inches. The precipitation member 30 can be formed in any suitable manner. For example, the precipitation member 30 can be formed from a single sheet of material or from more than one sheet of material.

The precipitation member 30 can be made of any suitable material in any suitable manner. In one example, the precipitation member 30 is made from translucent or transparent material. In another example, the precipitation member 30 is made from plastic. In yet another example, the precipitation member 30 is made from Plexiglass or Lexan. In one example, as illustrated in FIGS. 2A and 2B, a sheet of Lexan can be formed into a conical shape and riveted with at least one rivet 32. The rivets 32 can be aluminum pop rivets, and the sheet of Lexan can be 0.0625 inches thick. In another example, the precipitation member 30 can be molded or thermoformed in any suitable manner. For example, the precipitation member 30 can be formed by injection molding, blow molding, or thermoforming. It will be understood that the precipitation member 30 can be manufactured in any suitable manner. It will be further understood that the precipitation member can be manufactured using any suitable number of wall 34 pieces.

The precipitation member 30 can be fastened to the at least one elongated leg 18 in any suitable manner. In one example, referring to FIGS. 1A-1D, a reinforcing ring 36 can be provided. The ring 36 can be mounted to the elongated legs 18 by placing a pin through a mounting area 38 on the ring 36 and through a corresponding mounting area 40 on the elongated leg. The precipitation member 30 can be provided with at least one set of holes 42 through which a fastener (not shown), such as a tie, can be passed to fasten the precipitation member 30 to the reinforcing ring 36. The reinforcing ring 36 can have any suitable dimensions and be made of any suitable material. For example, the ring 36 can have a diameter of from about 5 to about 40 inches. In another, the ring 36 can have a diameter of about 15 inches or about 29.5 inches. In yet another example, the ring 36 can be made of stainless steel, plastic, or any other suitable material.

Figure 7:
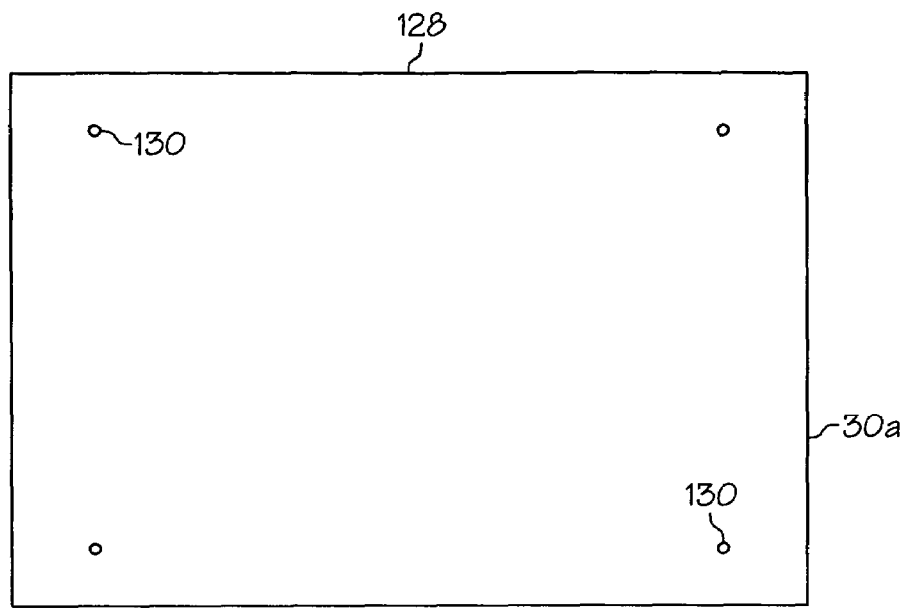
FIG. 7 is a front view of a precipitation member sheet in accordance with embodiments of the present invention.
Figure 8:
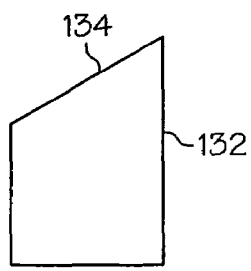
FIG. 8 is front view of a stop in accordance with embodiments of the present invention.
Figure 9:
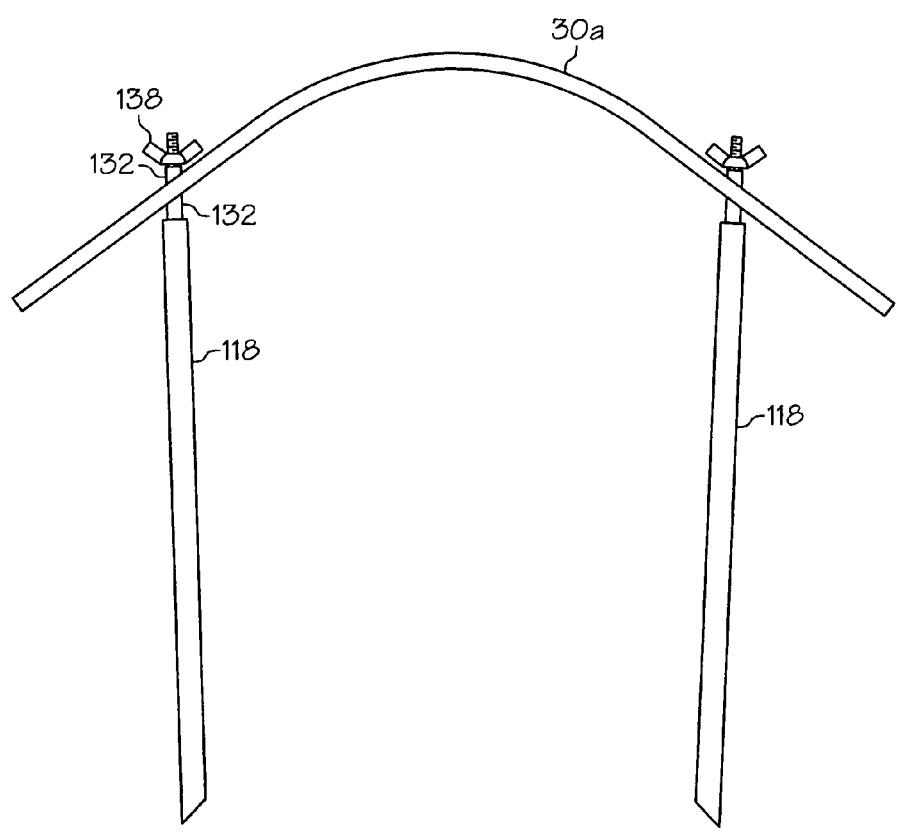
FIG. 9 is a front view of a precipitation member installed on elongated legs in accordance with embodiments of the present invention.

Referring now to FIGS. 7-9, another example of a precipitation member 30a is illustrated. The precipitation member 30a can be formed from a precipitation member sheet 128 that can comprise a sheet of any suitable material of any suitable dimension. For example, the precipitation member sheet can have dimensions of 36 inches long by 24 inches wide or 72 inches long by 48 inches wide. The precipitation member sheet 128 is disposed to be fastened to the elongated legs 118 in any suitable manner. For example, the precipitation member sheet 128 can have precipitation member holes 130 through which an elongated leg 118 can be passed. In one example, the elongated leg can have a rubber stop 132 having an angled portion 134 placed a distance from the top 136 of the elongated leg 118 prior to passing the leg 118 through the precipitation member hole 130. The sheet 128 can rest on the stop 132 and a second stop 132 can be placed on the near the top 136 of the elongated leg 118.

Any suitable fastener 138 can then be provided to fasten the precipitation member sheet 128 to the elongated leg 118. For example, a portion 137 of the elongated leg 118 can be threaded and a wing nut can be placed to hold the precipitation member sheet 128 in place. In one example, four precipitation member holes 130 are provided in a flexible precipitation member sheet 128, and four elongated legs 118 are fastened to the sheet 130 to form an arched precipitation member 30a as shown in FIG. 9. It will be understood that any suitable material can be used to form the arched precipitation member 30a. For example, the precipitation member sheet 128 can comprise flexible plastic, Plexiglass, or Lexan.

Referring now to FIGS. 10-13, a precipitation member 30a and an enclosure 11a are illustrated in an assembled configuration. In one example, the precipitation member 30a is disposed at a distance from the enclosure 11a on the elongated leg 18. This arrangement allows transpiration of water from the plant 142 or evaporation of water from the soil around the plant, and this prevents rotting of the plant material. In addition, this arrangement prevents overheating because air is exchanged with the atmosphere outside the enclosure. It will be understood that the precipitation member 30a can be installed in any other suitable manner from that illustrated in the Figures. It will be understood that the enclosure 11a and the precipitation member 30a can be used together, as illustrated. Alternatively, the enclosure 11a or the precipitation member 30a can be used alone with the elongated legs 118 to provide protection to a plant.

In another embodiment, the precipitation member 30 or 30a can be used without a enclosure 11 in conjunction with at least one elongated leg 18. The precipitation member 30 is disposed to deflect precipitation from at least some of the plant. The at least one elongated leg 18 is placed in the surface near to at least one plant. Such an arrangement is illustrated in FIG. 4C. In other examples, the precipitation members 30, 30a and/or the enclosures 11, 11a can add at least from about 0.5 to about 2.0 USDA Plant Hardiness Zone equivalents of protection to at least one plant during adverse conditions.

Without intending to be limiting, it is believed that the precipitation member reduces winter damage to plant tissue by restricting the amount of precipitation that can be accumulated in tender bud crown tissue or other tissue of plants.

In other embodiments of the present invention, methods of reducing damage to at least one plant due to weather conditions are provided. In one example, the method comprises placing at least one enclosure around at least one plant and anchoring the enclosure near to the surface around the at least one plant. The enclosure adds at least from about 0.5 to about 2.0 USDA Plant Hardiness Zone equivalents of protection to the plant during adverse conditions. For purposes of defining and describing the present invention, the term "adverse conditions" shall be understood as referring to temperature, wind, or precipitation conditions that are adverse to the plants survival. In one example, the enclosure adds from about 1 to about 1.5 USDA Plant Hardiness Zone equivalents of protection to the plant. The enclosure 11 can be removed during non-adverse conditions. Alternatively, the enclosure can be left in place year round.

Any suitable size plant can be placed inside the enclosure, and more than one plant can be placed inside the enclosure. The method can reduce winter foliar damage to the plant. The method can reduce spear leaf loss to the plant. The plant can be any suitable plant. For example, the plant can be a palm or a cycad.

In another example, the method comprises placing at least one enclosure around at least one plant, anchoring the enclosure near the surface around the at least one plant, placing at least one precipitation member over the enclosure, and anchoring the precipitation member in place. The precipitation member is disposed to deflect precipitation from the interior of the enclosure. The enclosure and precipitation member add at least from about 0.5 to 2.0 USDA Plant Hardiness Zone equivalents of protection to the plant. In one example, the enclosure and precipitation member add from about 1 to about 1.5 USDA Plant Hardiness Zone equivalents of protection to the plant. In another example, the precipitation member can be disposed at a distance from the enclosure. The precipitation member and enclosure can be used on any suitable plant of any suitable size. For example, the enclosure and precipitation member can be used on a plant up to six feet tall. In another example, the precipitation member and enclosure can be used on a palm or cycad. The enclosure and precipitation member can be removed during non-adverse conditions. Alternatively, the enclosure and precipitation member can be left in place year round.

In yet another example, the method comprises placing at least one precipitation member such that precipitation is deflected from at least one plant and anchoring the precipitation member in place. The precipitation member adds at least from about 0.5 to 2.0 USDA Plant Hardiness Zone equivalents of protection to the plant. In one example, the precipitation member adds from about 1 to about 1.5 USDA Plant Hardiness Zone equivalents of protection to the plant. The precipitation member can be used on any suitable plant of any suitable size. For example, precipitation member can be used on a plant up to six feet tall. In another example, the precipitation member can be used on a palm or cycad. The precipitation member can be removed during non-adverse conditions. Alternatively, the precipitation member can be left in place year round.

The present invention will be better understood by reference to the following example which is offered by way of illustration not limitation.

EXAMPLE 1

Protocol

A total of 30 open enclosures (15" and 30" diameter) and 23 precipitation members and enclosures (15" diameter; 15" and 30" height) were installed around palms sited on the Miami University campus and in the home landscape of D. Francko in early December (Table 1). A total of twelve commercially-important cold-hardy palm taxa were included in the data set. One additional precipitation member and enclosure was used to protect a non-palm target species (*Aspidistra elatior*; cast-iron plant) at the Francko site. One open enclosure was used to protect a grouping of *Gardenia jasminoides* and *Nerium oleander*, two additional non-palm ornamentals. One additional precipitation member was used at the Francko home site to protect a large grouping of *Trachycarpus fortunei*, *Sabal minor* variety "Louisiana", and *Cycas taintugensis*.

Plants were mulched with leaves (6-8") as per usual protocols of the Miami University Hardy Palm Project (1998-present; Francko 2000, 2003; Francko and Wilson 2001, 2003; Francko and Wilhoite 2002). Calibrated thermometers were set out among the experimental plants to record actual low temperatures at each microsite. In four enclosures, inside-outside thermometers were used to simultaneously measure temperatures both inside and outside the enclosures.

Throughout the winter season, plants were observed and temperatures and other environmental data was recorded at each plot containing test plants. Plant foliar damage, spear pulling percentages, and other performance data were recorded throughout the winter and again in mid-March, when enclosures were removed. Final data collection was done in mid-April when new spring growth was well underway.

To judge the efficacy of enclosures in preventing damage/mortality, these data sets were compared to a robust control set of palm performance data, with normal mulching alone, from the same species/varieties and the same test sites analyzed during 1998-2003 (summarized in Francko 2003 and in Table 1).

Results

For all 12 target palm species, enclosures and enclosures with precipitation members significantly improved winter performance (Table 1). Winter performance was also enhanced in the 3 non-palm ornamental species examined. The winter produced the lowest minimum temperatures recorded in the area in nearly 10 years—the enclosed palms uniformly outperformed palms exposed to much more moderate temperatures during the winters of 1998 through 2003.

Effect of Enclosures on Inside Temperatures

We hypothesized that enclosures would produced elevated temperatures near plants, as compared with environmental temperatures outside the enclosures. Monitoring of inside:outside thermometers indicated that, at best, thermal enhancement was modest, amounting to an average of 1-2° F. during the night, over a range of low temperatures between 30° F. and −14° F.

Foliar Damage Index

The foliar damage index (FDI) is a semi-quantitative scale that estimates the surface area of palm foliage that is killed by winter cold (Francko and Wilhoite 2002). An FDI=1 means that the palm foliage is essentially undamaged, a FDI of 2=15% or less foliar area killed, and an FDI of 7 indicated complete destruction of aboveground green tissue.

For each palm species tested, and precipitation member enclosures decreased the FDI by approximately 0.5 to 2.7 units, corresponding to a decrease in foliar damage equivalent to approximately 0.5 to 1.5 USDA Plant Hardiness Zones equivalent. In that the 2003-04 data set reflected much colder temperatures than the 5-year historical data set used for comparison (equivalent to approximately ½ of a USDA Plant Hardiness Zone) the devices described produced the equivalent of approximately 1 to 2 full USDA Plant Hardiness Zone equivalents of protection.

Put another way, damage to species such as *Trachycarpus fortunei* (Chinese windmill palm) in 2003-04 plots that reached −6° F. to −14° F. was essentially equivalent to that expected in unprotected palms at about 3 to 8F (Francko 2003). By extension, an end user of our invention in a more moderate climate, e.g. Zone 8 with a mean winter minimum of 15° F., could expect to overwinter with ease plants that are normally damaged at temperatures between about 25° F. and 30° F.

Figure 4:
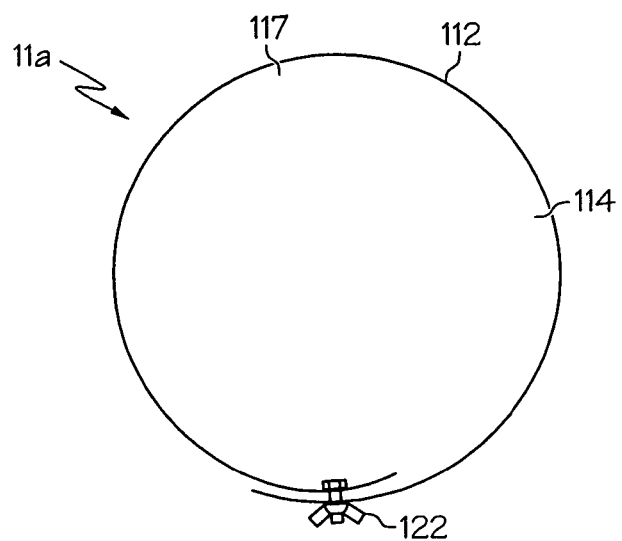
FIG. 4 is a top view of an enclosure in accordance with embodiments of the present invention.
Figure 5:
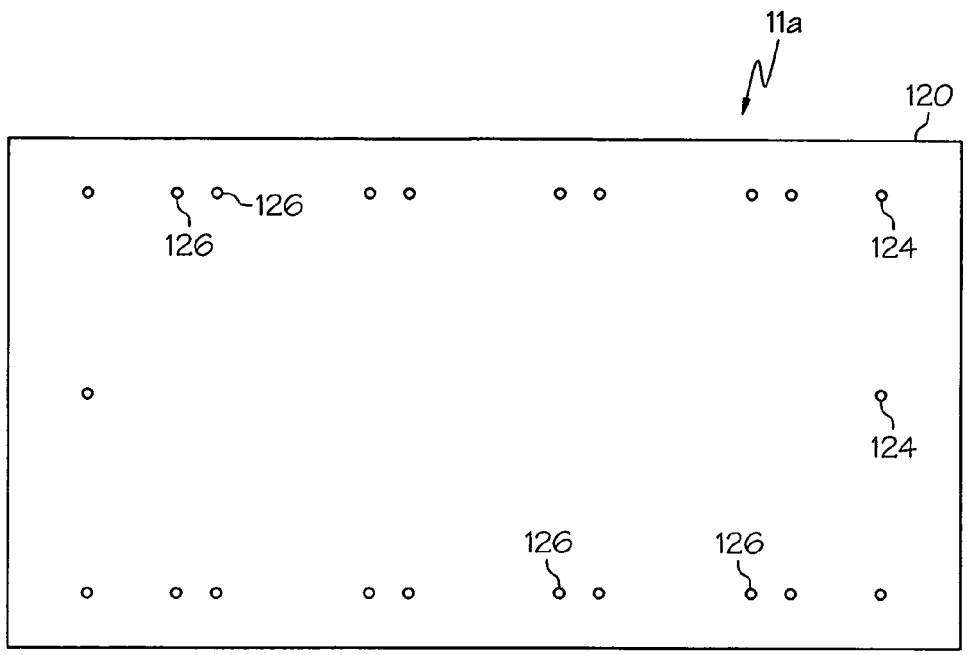
FIG. 5 is a front view of an enclosure sheet in accordance with embodiments of the present invention.
Figure 6:
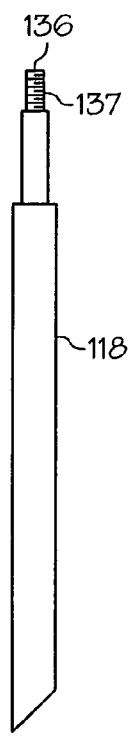
FIG. 6 is a front view of an elongated leg in accordance with embodiments of the present invention.

In cases where enclosures outperformed enclosures and precipitation member, it is important to emphasize that the open cylinders were used for smaller plants which were completely covered with snow during the coldest nights of the winter, and thus were sheltered from the coldest air. In contrast, palms in enclosures and precipitation member were exposed to the full force of environmental temperatures since they were not completely covered with snow or mulch. (FIG. 4 illustrates appearance of various palms after winter exposure, as a visual record of the quantitative information in Table 1).

Spear Loss

In many commercially-important cold-hardy palm species, cold temperatures damage the newly-emerging spear leaf and the bud tissue in the trunk that gives rise to additional spear leaves. This damage appears to be exacerbated by freezing and thawing precipitation that collects in the open crown cavities of these species, damaging tissues and promoting disease (reviewed in Francko 2003). In needle palm and Chinese windmill palm, spear damage and loss can occur at temperatures that are too warm to damage existing foliage. Left untreated, progressive crown rot disease often kills damaged palms in the early spring.

Spear leaf loss rates were greatly reduced in both open and precipitation member enclosures (Table 1). In species such as *T. fortunei*, where spear loss occurs at virtually 100% rates when temperatures are near or below 0 F, only ca. ¼ to ⅓ of enclosed palms lost spears, a low rate that has not been duplicated by any other protection methods (reviewed by Francko 2003).

Mortality

Precipitation members and enclosures greatly enhanced palm mortality rates, even at the once-per-decade, extremely low environmental temperatures recorded during the experiment. No enclosed individuals of *R. hystrix*, *S. minor*, or *S.* 'Louisiana' suffered mortality and grew normally during spring (N=15 total). Even in these hardiest three taxa, some mortality would be expected in normally mulched specimens at these low temperatures (Francko 2003).

Historical data on Chinese windmill palms (reviewed in Francko 2003) suggests that nearly 50% mortality can be expected even in well-mulched specimens subjected to below-zero temperatures (Francko 2003)—this was reduced to 14% (2 individuals out of 14) by enclosing palms in enclosures and precipitation members. Similarly, in *T. takil*, mortality was reduced from ca. ⅓ to zero by enclosing palms in enclosures and precipitation members.

For palm species truly marginal at temperatures at or below zero (e.g., *W. robusta* and *filifera*, and *B. capitata*), the kinds of environmental temperatures recorded during the experiment would be expected to be uniformly fatal (Francko 2003); enclosures did not improve survivorship. Importantly, given the winter performance data for hardier palms above, these species would have been expected to survive at a high rate within enclosures had winter conditions been more typical for our region (e.g. ca. 2-3° F. on campus, -6° F. at colder sites). Thus, the device is effective in reducing mortality of genera such as Washingtonia and Butia in regions with USDA 7 (and colder parts of Zone 8) climates, where these species are considered marginally hardy, and/or "Zone 9" species in Zones 7b and 8, et cetera.

In the hardy cycad species studied, *C. taitungensis*, mortality was reduced from ca. 50% to zero. *Aspidistra, Gardenia*, and *Nerium* specimens similarly survived the winter within enclosures and precipitation members. Although the sample sizes of non-palm species was relatively small, the observation that no non-palm target specimen studied suffered mortality strongly supports the efficacy of our enclosures in protecting non-palms through truly severe winter conditions.

TABLE 1

Comparison of mean palm foliar damage indices[1], spear loss, and mortality in palms protected with enclosures and/or precipitation members (Experimental data; N-number in parentheses) versus palms protected with mulching alone (1998-2003 reference data; in parentheses). Palms from 1998-2003 exposed to winter minima ranging from −2° F. (Miami campus) to −12° F. (Francko home landscape). Palms during the experiment were subjected to even colder temperatures (−6° F. to −8° F. on campus; −14° F. at Francko home landscape).

| | Data | | | | | |
|---|---|---|---|---|---|---|
| | Foliar Damage Index (1998-2003 value) | | Spear Loss % (1998-2003 value) | | Mortality % (1998-2003 value) | |
| Species[2] | Open | Protected | Open | Protected | Open | Protected |
| *R. hystrix* | 2.7 (6) | — | 0 | — | 0 | — |
| | (3.2) | — | (25) | — | (0) | — |
| *S. minor* | 3.5 (6) | — | 0 | — | 0 | — |
| | (5.0) | — | (5) | — | (5) | — |
| *S.* 'Louis.' | 2.5 (5) | — | 0 | — | 0 | — |
| | (4.0) | — | (0) | — | (0) | — |
| *Trachy. for* | 3.0 (4) | 4.7 (10) | 25 | 35 | 0 | 14 |
| | (5.7) | — | (100) | — | (45) | — |
| *Trachy tak.* | 3.5 (2) | 5 (1) | 0 | 100 | 0 | 0 |
| | (5.9) | — | (72) | — | (36) | — |
| *S. palmetto* | 5.0 (4) | 5.2 (4) | 0 | 0 | 0 | 0 |
| | (6.0) | — | (0) | — | (10) | — |
| *S.* 'Birmng.' | 4.0 (1) | 4.0 (3) | 0 | 0 | 0 | 0 |
| | (5.0) | — | (0) | — | (0) | — |
| *W. robusta* | — | 7.0 (1) | — | 100 | — | 100 |
| | (7.0) | — | (100) | — | (100) | — |
| *W. filifera* | — | 7.0 (2) | — | 50 | — | 100 |
| | (7.0) | — | (100) | — | (100) | — |
| *Butia cap.* | — | 7.0 (1) | — | 100 | — | 100 |
| | (7.0) | — | (100) | — | (100) | — |
| *Cycas tian.* | 6.0 (2) | 6.0 (1) | — | N/A | — | 0 |
| | (7.0) | — | — | N/A | (50) | — |

[1]Mean palm foliar damage indices computed from following scale of total leaf area destroyed: 1 = no damage, 2 = 15% or less destroyed, 3 = 15-30%, 4 = 30-75%, 5 = 75-90%, 6 = greater than 90% destroyed but petiole bases green, 7 = all above surface tissue destroyed (Francko and Wilhoite 2002).
[2]*R. hystrix* = *Rhapidophyllum hystrix* (needle palm), *S. minor* = *Sabal minor* (dwarf palmetto), *S.* 'Louis.' = *Sabal minor* variety "Louisiana" (Louisiana sabal palm), *Trachy. for.* = *Trachycarpus fortunei* (Chinese windmill palm), *Trachy. tak.* = *Trachycarpus takil* (Himalayan windmill palm), *S. palmetto* = *Sabal palmetto* (cabbage palmetto), *S.* 'Birmng' = *Sabal* 'Birmingham', *W. robusta* = *Washingtonia robusta* (Mexican fan palm), *W. filifera* = *Washingtonia filifera* (California fan palm, *Butia cap.* = *Butia capitata* (jelly palm), *Cycas tian.* = *Cycas tiantugensis* (Emperor sago)

REFERENCES

Francko, D. A. 2000. Effect of microclimate variation on cultivation of cold-hardy palms in Southwestern Ohio. Palms. 44:37-46.

Francko, 2003. Palms Won't Grow Here and Other Myths: Warm-Climate Plants for Cooler Areas. Timber Press, Portland, Oreg. and Cambridge, UK, 308 pp.

Francko, D. A. and S. Wilhoite. 2002. Cold-hardy palms in Southwestern Ohio: Winter damage, mortality, and recovery. Palms. 46(l):5-13.

Francko, D. A. and K. G. Wilson. 2001. The Miami University Hardy Palm Project. Rhapidophyllum. 10(2):12-15.

Francko, D. A. and K. G. Wilson. 2003. When Zone 6 becomes Zone 5: The Miami University Hardy Palm Project. Rhapidophyllum. 11(1)6-10,19.

Roth, S. A. and D. Schrader. 2000. Hot Plants for Cool Climates: Gardening with Tropical Plants in Temperate Zones. Houghton Mifflin, Boston, Mass., 228 pp.

Southeastern Palm and Exotic Plant Society (SPEPS). 1994. The Palm Reader: A Manual for Growing Plams Outdoors in the Southeast. Available via http://www.ces.uga.edu/Agriculture/horticulture/Palmreader.html.

It will be apparent to those skilled in the art that various changes may be made without departing from the scope of the invention, which is not to be considered limited to what is described in the specification.

What is claimed is:

1. A device for plant protection, comprising:
   an enclosure for substantially enclosing an area around at least one plant, said enclosure having a lower opening, an upper opening, and at least one wall extending between said lower opening and said upper opening;
   a plurality of elongated members, each of said elongated members including a lower portion, a middle portion, and an upper portion; and
   a deflector,
   wherein said lower portion of each elongated member is operable to be placed in the ground so that said lower opening is substantially closed by the ground,
   wherein said middle portion of each elongated member extends substantially parallel to said at least one wall,
   wherein said upper portion of each elongated member extends above said upper opening to support said deflector above said upper opening, and
   wherein said deflector is sized and shaped to substantially prevent precipitation from entering said enclosure.

2. The device according to claim 1, wherein said device includes four elongated members.

3. The device according to claim 2, wherein said elongated members are evenly spaced around an outer periphery of said enclosure.

4. The device according to claim 3, wherein said deflector is arched, and an apex of said deflector extends substantially over a center of said enclosure.

5. The device according to claim 1, wherein said enclosure is selected to be one of transparent to light and translucent to light.

6. The device according to claim 1, wherein said enclosure is one of cylindrical and rectangular.

7. The device according to claim 1, wherein said enclosure comprises one of plastic, Plexiglas, and Lexan.

8. The device according to claim 1, wherein said deflector comprises an arched shape.

9. The device according to claim 1, wherein the deflector comprises a conical shape.

10. The device according to claim 1, wherein the deflector comprises one of plastic, Plexiglas, and Lexan.

11. A plant protection kit, comprising:
    at least one enclosure for substantially enclosing an area around at least one plant, said enclosure having a lower opening, an upper opening, and at least one wall extending between said lower opening and said upper opening;
    a plurality of elongated members, each of said elongated members including a lower portion, a middle portion, and an upper portion; and
    at least one deflector,
    wherein said at least one enclosure, plurality of elongated members, and at least one deflector are configured to be disposed to provide wind and precipitation protection to at least one plant,
    wherein said lower portion of each elongated member is operable to be placed in the ground so that said lower opening is substantially closed by the ground,
    wherein said middle portion of each elongated member extends substantially parallel to said at least one wall,
    wherein said upper portion of each elongated member extends above said upper opening to support said deflector above said upper opening, and
    wherein said deflector is sized and shaped to substantially prevent precipitation from entering said enclosure.

12. A plant protection kit, comprising:
    at least one enclosure sheet configured to be disposed to form a enclosure for substantially enclosing an area around at least one plant, said enclosure having a lower opening, an upper opening, and at least one wall extending between said lower opening and said upper opening;
    a plurality of elongated members, each of said elongated members including a lower portion, a middle portion, and an upper portion; and
    at least one deflector sheet configured to be disposed to form a deflector,
    wherein said at least one enclosure, plurality of elongated members, and at least one deflector are configured to be disposed to provide wind and precipitation protection to at least one plant,
    wherein said lower portion of each elongated member is operable to be placed in the ground so that said lower opening is substantially closed by the ground,
    wherein said middle portion of each elongated member extends substantially parallel to said at least one wall,
    wherein said upper portion of each elongated member extends above said upper opening to support said deflector above said upper opening, and
    wherein said deflector is sized and shaped to substantially prevent precipitation from entering said enclosure.

13. A device for plant protection, comprising:
    an enclosure for substantially enclosing an area around at least one plant, said enclosure having a lower opening, an upper opening, and at least one wall extending between said lower opening and said upper opening;
    a plurality of elongated members, each of said elongated members including a lower portion, a middle portion, and an upper portion; and
    a deflector,
    wherein said lower portion of each elongated member is operable to be placed in the ground so that said lower opening is substantially closed by the ground,
    wherein said middle portion of each elongated member extends substantially parallel to said at least one wall,
    wherein said upper portion of each elongated member extends above said upper opening to support said deflector above said upper opening,
    wherein said deflector is sized and shaped to substantially prevent precipitation from entering said enclosure, and
    wherein said device adds at least from about 0.5 to about 2.0 USDA Plant Hardiness Zone Equivalents of protection to a plant placed in said enclosure.

14. A method of reducing damage to at least one plant due to adverse conditions, comprising:

placing at least one device according to claim 1 around at least one plant; and anchoring said at least one device around said at least one plant, wherein said step of placing said at least one device around said at least one plant adds at least from about 0.5 to about 2.0 USDA Plant Hardiness Zone equivalents of protection to said at least one plant during adverse conditions.

15. The method as claimed in claim 14 wherein said step of anchoring said at least one device near to the surface comprises placing at least one elongated member to which at least one enclosure is fastened into said surface.

16. The method as claimed in claim 14 further comprising removing said at least one device during non-adverse conditions.

17. The method as claimed in claim 14 wherein said step of placing said at least one device around said at least one plant comprises placing said at least one device around at least one palm.

18. The method as claimed in claim 14 wherein said step of placing said at least one device around said at least one plant comprises placing said at least one device around at least one cycad.

* * * * *